United States Patent
Miyazaki et al.

(10) Patent No.: US 10,473,999 B2
(45) Date of Patent: Nov. 12, 2019

(54) OPTICAL MODULATOR WITH FPC AND OPTICAL TRANSMISSION DEVICE USING SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 16/084,236

(22) PCT Filed: Apr. 24, 2017

(86) PCT No.: PCT/JP2017/016136
§ 371 (c)(1),
(2) Date: Sep. 12, 2018

(87) PCT Pub. No.: WO2017/188167
PCT Pub. Date: Nov. 2, 2017

(65) Prior Publication Data
US 2019/0056633 A1    Feb. 21, 2019

(30) Foreign Application Priority Data
Apr. 28, 2016    (JP) ................. 2016-090364

(51) Int. Cl.
*H01P 3/16* (2006.01)
*G02F 1/225* (2006.01)
(Continued)

(52) U.S. Cl.
CPC ....... *G02F 1/2255* (2013.01); *G02B 6/29352* (2013.01); *G02F 1/035* (2013.01);
(Continued)

(58) Field of Classification Search
USPC ....... 385/2; 343/837, 907; 455/130; 359/279
See application file for complete search history.

(56) References Cited

U.S. PATENT DOCUMENTS 9,316,887 B2    4/2016    Sugiyama
9,571,203 B2    2/2017    Sugiyama
(Continued)

FOREIGN PATENT DOCUMENTS

JP    H088499        1/1996
JP    2000114815    4/2000
(Continued)

OTHER PUBLICATIONS

"International Search Report (Form PCT/ISA/210)" of PCT/JP2017/016136, dated Jul. 25, 2017, with English translation thereof, pp. 1-4.

(Continued)

Primary Examiner — Eric Wong
(74) Attorney, Agent, or Firm — JCIPRNET

(57) ABSTRACT

In an optical modulator including an FPC for performing electrical connection with an external circuit substrate, to maintain high light transmission quality by appropriately driving the optical modulator even when the reflection of a radio frequency signal occurs in a connection portion between the FPC and the main body of the optical modulator. Provided is an optical modulator including a flexible printed circuit for performing electrical connection with a circuit substrate, in which the flexible printed circuit includes at least one wire pattern for propagating a radio frequency signal, and the wire pattern includes at least one radio frequency attenuation portion for attenuating power of the radio frequency signal by a predetermined amount.

10 Claims, 11 Drawing Sheets

(51) Int. Cl.
*G02F 1/035* (2006.01)
*G02B 6/293* (2006.01)
*H04B 10/532* (2013.01)
*G02B 6/12* (2006.01)
*G02F 1/21* (2006.01)

(52) U.S. Cl.
CPC . *H04B 10/532* (2013.01); *G02B 2006/12142* (2013.01); *G02F 2001/212* (2013.01)

(56) References Cited

U.S. PATENT DOCUMENTS

| | | |
|---|---|---|
| 9,778,539 B2 | 10/2017 | Miyazaki et al. |
| 9,806,201 B2 * | 10/2017 | Yamazaki ......... H01L 29/78693 |
| 10,001,694 B1 * | 6/2018 | Lee ....................... G02F 1/2255 |
| 2003/0227666 A1 | 12/2003 | Bridges |
| 2017/0133761 A1 * | 5/2017 | Song ................... H01Q 1/3208 |

FOREIGN PATENT DOCUMENTS

| | | |
|---|---|---|
| JP | 2014089310 | 5/2014 |
| JP | 2014199370 | 10/2014 |

OTHER PUBLICATIONS

"Office Action of Japan Counterpart Application," drafted on Jul. 14, 2017, with English translation thereof, p. 1-p. 6.
"Office Action of Japan Counterpart Application," drafted on Feb. 27, 2018, with English translation thereof, p. 1-p. 4.

* cited by examiner cross-sectional view in a direction of BB line

US 10,473,999 B2

OPTICAL MODULATOR WITH FPC AND OPTICAL TRANSMISSION DEVICE USING SAME

CROSS-REFERENCE TO RELATED APPLICATION

This application is a 371 application of International PCT application serial no. PCT/JP2017/016136, filed on Apr. 24, 2017, which claims the priority benefit of Japan application no. 2016-090364, filed on Apr. 28, 2016. The entirety of each of the abovementioned patent applications is hereby incorporated by reference herein and made a part of this specification.

TECHNICAL FIELD

The present invention relates to an optical modulator and an optical transmission device and particularly to an optical modulator including a flexible printed circuit (FPC) for inputting radio frequency signals and an optical transmission device using the same.

BACKGROUND ART

In high-frequency/high-capacity optical fiber communication systems, optical modulators embedded with waveguide-type optical modulation elements are frequently used. Among these, optical modulation elements in which $LiNbO_3$ (hereinafter, also referred to as LN) having an electro-optic effect is used for substrates cause only a small light loss and are capable of realizing broad optical modulation characteristics and are thus widely used for high-frequency/high-capacity optical fiber communication systems.

In an optical modulation element in which this LN is used, Mach-Zehnder-type optical waveguides, RF electrodes for applying radio frequency signals, which are modulation signals, to the optical waveguides, and bias electrodes for performing a variety of adjustments for favorably maintaining modulation characteristics in the waveguides are provided. In addition, these electrodes provided in the optical modulation element are connected to an external electronic circuit via lead pins or connectors provided in a package case of the optical modulator which accommodates the optical modulation element.

On the other hand, regarding modulation forms in optical fiber communication systems, in response to the recent trend of an increase in transmission capacity, multilevel modulation or transmission formats achieved by incorporating polarization multiplexing into multilevel modulation such as Quadrature Phase Shift Keying (QPSK) or Dual Polarization-Quadrature Phase Shift Keying (DP-QPSK) has become mainstream.

Optical modulators performing QPSK modulation (QPSK optical modulators) or optical modulators performing DP-QPSK modulation (DP-QPSK optical modulators) include a plurality of Mach-Zehnder-type optical waveguides having a nested structure and include a plurality of radio frequency signal electrodes and a plurality of bias electrodes (see, for example, Patent Literature No. 1) and thus tend to cause an increase in the sizes of package cases of the optical modulators, which creates a strong demand for, particularly, size reduction.

As a measure for satisfying the above-described demand for size reduction, an optical modulator in which push-on-type coaxial connectors provided in the package case of an optical modulator of the related art as interfaces of the RF electrodes are replaced by the same lead pins as the interfaces of the bias electrodes and a flexible printed circuit (FPC) for connecting these lead pins to external circuit substrates is added is proposed.

For example, in a DP-QPSK optical modulator, an optical modulation element constituted of four Mach-Zehnder-type optical waveguides respectively having RF electrodes is used. In this case, four push-on-type coaxial connectors provided in the package case of the optical modulator inevitably increase the size of the package case, but the use of the lead pins and an FPC instead of the coaxial connectors enables size reduction.

In addition, since the lead pins in the package case of the optical modulator and a circuit substrate on which electronic circuits for causing modulation operations in the optical modulator are mounted are connected to each other through the FPC, it is not necessary to perform the excess length treatment of coaxial cables used in the related art, and it is possible to decrease the installation space of the optical modulator in optical transmission devices.

An FPC which is used in the optical modulator is produced using, for example, a flexible polyimide-based material as a substrate (hereinafter, an FPC substrate), and a plurality of through-holes provided in the vicinity of one end portion are respectively electrically connected to individual pads provided in the other end portion through wire patterns. In addition, a plurality of the lead pins protruding from the bottom surface or side surfaces of the package case of the optical modulator are respectively inserted into the plurality of through-holes and are fixed by means of, for example, soldering and electrically connected to the through-holes, and the plurality of pads are fixed by means of, for example, soldering and connected to the circuit substrate. Therefore, radio frequency signals that are supplied from the pads on the circuit substrate are supplied to the corresponding RF electrodes in the optical modulation element through the respective corresponding through-holes and lead pins, whereby high-frequency optical modulation is performed.

As described above, the optical modulator in which an FPC is used enables the size reduction of the package case and also a decrease in the installation space of the optical modulator on the circuit substrate and is thus capable of significantly contributing to the size reduction of optical transmission devices.

FIGS. 9(a) to 9(c) are views illustrating the constitution of an optical modulator of the related art which includes such an FPC, and FIG. 9(a), FIG. 9(b), and FIG. 9(c) are a top view, a front view, and a bottom view of the optical modulator, respectively. The optical modulator 900 includes an optical modulation element 902, a package case 904 accommodating the optical modulation element 902, a flexible printed circuit (FPC) 906, an optical fiber 908 for making light incident on the optical modulation element 902, and an optical fiber 910 guiding the light output from the optical modulation element 902 to the outside of the package case 904.

In the package case 904, four lead pins 920, 922, 924, and 926 respectively connected to four RF electrodes (not illustrated) of the optical modulation element 902 are provided, and the lead pins 920, 922, 924, and 926 are inserted into through-holes 1020, 1022, 1024, and 1026 described below, which are provided in the FPC 906, and are fixed by means of, for example, soldering and electrically connected to the through-holes.

FIGS. 10(a) and 10(b) are views illustrating the constitution of the FPC 906. FIG. 10(a) is a view illustrating the constitution of one surface of the FPC 906 (for example, a surface illustrated in FIG. 9(c), referred to as a "front surface" here), and FIG. 10(b) is a view illustrating the constitution of the other surface (referred to as a "back surface") of the FPC 906. On the front surface illustrated in FIG. 10(a), four pads 1010, 1012, 1014, and 1016 are provided in parallel in the vicinity of one side 1000 on the lower side in the drawing, along the direction of the side 1000. In addition, four through-holes 1020, 1022, 1024, and 1026 are provided in parallel on a side of the other side 1002 opposite to the side 1000, for example, along the direction of the side 1002. Further, the four pads 1010, 1012, 1014, and 1016 are electrically connected to the through-holes 1020, 1022, 1024, and 1026 through wire patterns 1030, 1032, 1034, and 1036, respectively.

On the other hand, a ground pattern 1040 (a hatched portion shown in the drawing) is formed on the back surface illustrated in FIG. 10(b). In order to avoid an electrical contact between the ground pattern 1040 and the through-holes 1020, 1022, 1024, and 1026, a conductor constituting the ground pattern 1040 is removed in a circular shape in the peripheral portions of the through-holes 1020, 1022, 1024, and 1026.

Each of the wire patterns 1030, 1032, 1034, and 1036 formed on the front surface illustrated in FIG. 10(a) may be designed such that, for example, characteristic impedance is set to 50 Ω by the ground pattern 1040 formed on the back surface with the substrate of the FPC 906 interposed therebetween.

The four pads 1010, 1012, 1014, and 1016 are respectively fixed by means of, for example, soldering and electrically connected to the pads in the external circuit substrates, whereby the RF electrodes in the optical modulation element 902 included in the optical modulator 900 and electronic circuits constituted on the circuit substrates are electrically connected to each other and the optical modulator 900 is driven. Meanwhile, the shape of the FPC 906 is generally a horizontally long rectangular shape having a short side in a signal transmission direction as illustrated in the drawing in order to extremely shorten wire patterns and suppress microwave loss at a low level, and is a rectangular shape which is approximately 20 mm or less in the long side direction and approximately 10 mm or less in the short side direction in a case where the FPC includes the four pads 1010, 1012, 1014, and 1016 as in the example illustrated in the drawing.

FIGS. 11(a) and 11(b) are views illustrating an example of a state where the optical modulator 900 is connected to a circuit substrate on which an electronic circuit is constituted. FIG. 11(a) is a view of the optical modulator 900 seen from above (a direction in which the surface illustrated in FIG. 9(a) is seen), and FIG. 11(b) is a cross-sectional view in a direction of BB line in FIG. 11(a). Meanwhile, the internal constitution of the optical modulator 900 in FIG. 11(b) is not illustrated.

An electronic circuit including a driving circuit 1104 for driving the optical modulation element 902 of the optical modulator 900 is constituted on the circuit substrate 1100, and the optical modulator 900 and the circuit substrate 1100 are fixed to, for example, a base 1102 inside a package case of an optical transmission device. As illustrated in FIG. 11(a), the FPC 906 of the optical modulator 900 extends from the connection portions with the lead pins 920, 922, 924, and 926 toward the left in the drawing and bends slantwise in the left downward direction in the drawing so as to come into contact with the circuit substrate 1100 at the left end portion as illustrated in FIG. 11(b), whereby the pads 1010, 1012, 1014, and 1016 of the FPC 906 are fixed by means of, for example, soldering and electrically connected to the pads 1110, 1112, 1114, and 1116 on the circuit substrate 1100 (FIG. 11(a)).

Meanwhile, the connection between the ground pattern 1040 and the optical modulator 900 can be performed, for example, by providing a lead pin for grounding (not illustrated) connected to a ground pattern formed on the optical modulation element 902 in the package case 904, providing a hole (not illustrated) engaging with the lead pin for grounding in the FPC 906, and inserting the lead pin for grounding into the hole so as to be soldered to the ground pattern 1040. In addition, the connection between the ground pattern and the circuit substrate 1100 can be performed, for example, by providing a conductor pin (not illustrated) brazed to the ground pattern 1040 in the FPC 906 and connecting the conductor pin and the ground pattern on the circuit substrate 1100 by soldering.

In the optical modulator 900 having the above-described constitution, the driving circuit 1104 provided on the circuit substrate 1100 and the lead pins 920, 922, 924, and 926 of the optical modulator 900 are connected to each other through the wire patterns 1030, 1032, 1034, and 1036 having predetermined characteristic impedance. Thereby, the output impedance of the driving circuit 1104, the input impedance of the optical modulator 900, and characteristic impedance of the wire patterns 1030, 1032, 1034, and 1036 are matched to each other, whereby it is possible to efficiently propagate a radio frequency signal from the driving circuit 1104 to the optical modulator 900 in principle.

However, a mismatching portion of impedance is actually generated in a path of a radio frequency signal from the driving circuit 1104 to the optical modulator 900 due to manufacturing variations of the FPC 906 or the like, and the radio frequency signal may be reflected due to the impedance mismatching. In particular, such impedance mismatching easily occurs in soldering connection portions between the lead pins 920, 922, 924, and 926 provided in the package case 904 and the through-holes 1020, 1022, 1024, and 1026 provided in the FPC 906.

That is, in general, outer diameters of the lead pins 920, 922, 924, and 926 and inner diameters of the through-holes 1020, 1022, 1024, and 1026 are not fixed at all times between products, and the lead pins and the through-holes are manufactured with a certain dimension tolerance. For this reason, variations in distances between the outer surfaces of the lead pins 920, 922, 924, and 926 and the inner surfaces of the through-holes 1020, 1022, 1024, and 1026, variations in the shape of soldering, and the like occur in the soldering connection portions between the lead pins 920, 922, 924, and 926 and the through-holes 1020, 1022, 1024, and 1026, and impedance mismatching easily occurs due to the variations.

When such impedance mismatching occurs, a portion of power of a radio frequency signal passing through a portion in which the mismatching occurs is reflected from the portion toward a direction opposite to a propagation direction, and is incident on, for example, the output of the driving circuit 1104. As a result, operation in the driving circuit 1104 becomes unstable, and an unstable phenomenon such as noise occurs in the radio frequency signal output from the driving circuit 1104 in some cases, which may result in a problem in transmission quality of an optical system using the optical modulator 900.

SUMMARY OF INVENTION

Technical Problem

In consideration of the above-described background, in optical modulators including an FPC for performing electrical connection with an external circuit substrate, it is desirable to realize a constitution capable of maintaining high light transmission quality by appropriately driving the optical modulator even when the reflection of a radio frequency signal occurs in a connection portion between the FPC and the main body of the optical modulator.

Solution to Problem

An aspect of the present invention is an optical modulator including a flexible printed circuit for performing electrical connection with a circuit substrate. In the optical modulator, the flexible printed circuit includes at least one wire pattern for propagating a radio frequency signal, and the wire pattern includes at least one radio frequency attenuation portion for attenuating power of the radio frequency signal by a predetermined amount.

According to the aspect of the present invention, the radio frequency attenuation portion is formed of a portion of the wire pattern loaded with a radio frequency attenuation film.

According to the aspect of the present invention, the radio frequency attenuation film is formed of a material including carbon and/or ferrite.

According to the aspect of the present invention, the radio frequency attenuation portion is a curved conductor pattern which is formed such that a propagation direction of the radio frequency signal is curved up to an angle equal to or greater than 90 degrees with a predetermined curvature.

According to the aspect of the present invention, the radio frequency attenuation portion is a conductor pattern which is formed such that a propagation direction of the radio frequency signal is bent up to an angle equal to or greater than 90 degrees.

According to the aspect of the present invention, the flexible printed circuit is formed such that the wire pattern is provided on one surface and a ground pattern is provided on the other surface, and the radio frequency attenuation portion is formed by removing a portion of a conductor of the ground pattern on the other surface in a predetermined distance range from a portion of the wire pattern provided on the one surface.

According to the aspect of the present invention, the portion of the wire pattern provided on the one surface is a curved portion of a conductor pattern forming the wire pattern.

According to the aspect of the present invention, the portion of the wire pattern provided on the one surface is a curved portion of a curved conductor pattern which is formed such that a propagation direction of the radio frequency signal is curved up to an angle equal to or greater than 90 degrees with a predetermined curvature.

According to the aspect of the present invention, the portion of the wire pattern provided on the one surface is a curved portion of a conductor pattern which is formed such that a propagation direction of the radio frequency signal is bent up to an angle equal to or greater than 90 degrees.

Another aspect of the present invention is an optical transmission device including any one of the optical modulators, and an electronic circuit outputting at least a radio frequency signal for causing the optical modulator to perform a modulation operation.

DESCRIPTION OF EMBODIMENTS

Hereinafter, embodiments of the present invention will be described with reference to the accompanying drawings.

First Embodiment

Figure 1A:
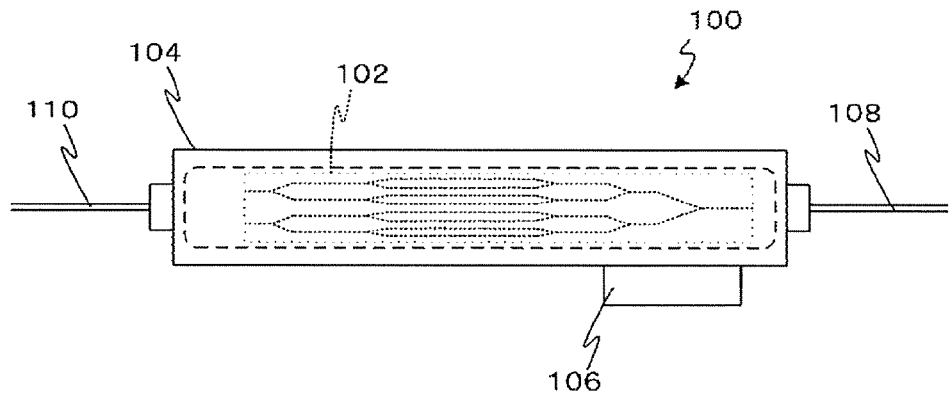
FIGS. 1(a) to 1(c) are views illustrating the constitution of an optical modulator according to a first embodiment of the present invention.
Figure 1B:
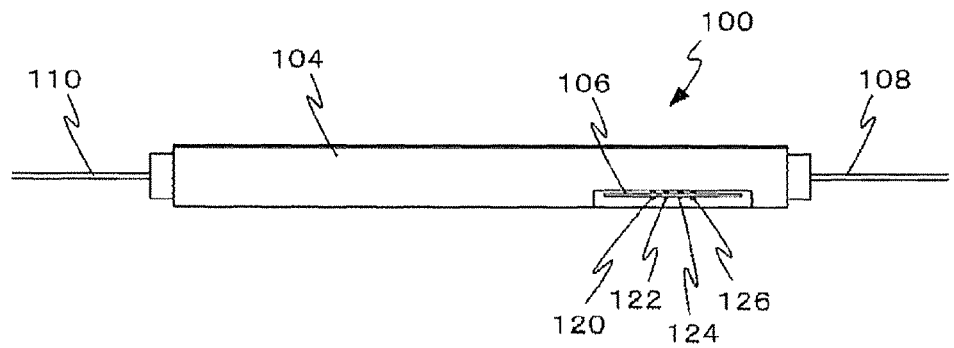
Figure 1C:
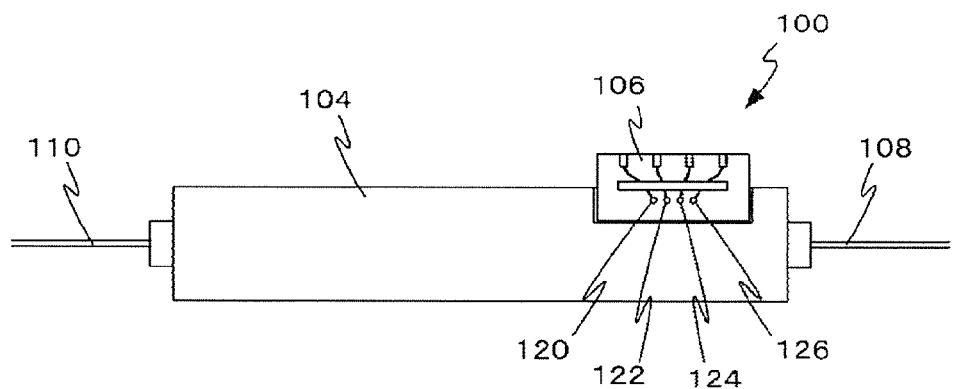

First, an optical modulator according to a first embodiment of the present invention will be described. FIGS. 1(a) to 1(c) are views illustrating the constitution of an optical modulator according to an embodiment of the present invention.

The present optical modulator 100 includes an optical modulation element 102, a package case 104 accommodating the optical modulation element 102, a flexible printed circuit (FPC) 106 for performing electrical connection between lead pins 120, 122, 124, and 126 describe below, which are provided in the package case 104, and an external circuit substrate, an optical fiber 108 for making light incident on the optical modulation element 102, and an optical fiber 110 guiding light output from the optical modulation element 102 to the outside of the package case 104.

The optical modulation element 102 is, for example, a DP-QPSK optical modulator including four Mach-Zehnder-type optical waveguides provided on an LN substrate and four radio frequency electrodes (RF electrodes) which are respectively provided on the Mach-Zehnder-type optical waveguides and modulate light waves propagating through the optical waveguides. Two light rays output from the optical modulation element 102 are polarization-synthesized using, for example, a lens optical system and are guided to the outside of the package case 104 through the optical fiber 110.

The package case 104 includes four lead pins 120, 122, 124, and 126 that are respectively connected to the four RF electrodes (not illustrated) in the optical modulation element 102. The lead pins 120, 122, 124, and 126 provided in the package case 104 are inserted into through-holes 220, 222, 224, and 226 described below, which are provided in an FPC 106, and the through-holes 220, 222, 224, and 226 and the lead pins 120, 122, 124, and 126 are respectively connected and fixed to each other by means of, for example, soldering.

Figure 2A:
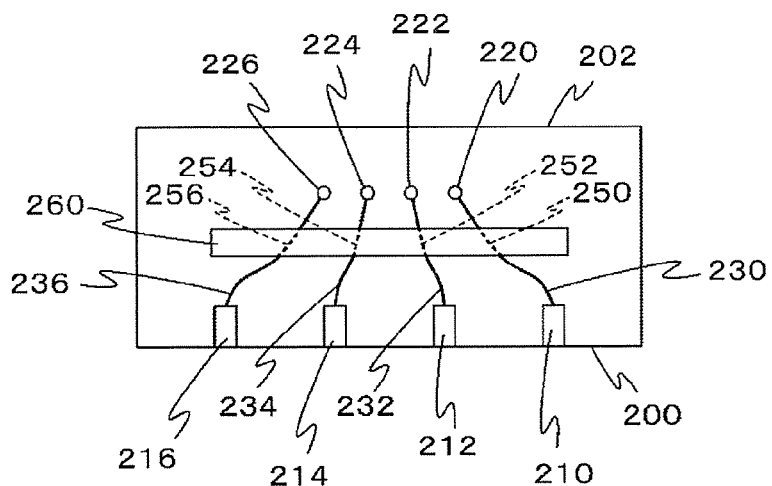
FIGS. 2(a) and 2(b) are views illustrating the constitution of an FPC which is used in the optical modulator illustrated in FIGS. 1(a) to 1(c).
Figure 2B:
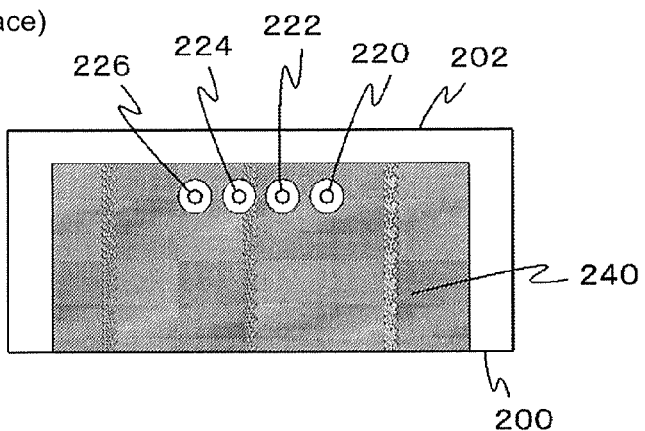

FIGS. 2(a) and 2(b) are views illustrating the constitution of the FPC 106. FIG. 2(a) is a view illustrating the constitution of a surface of the FPC 106 (for example, a surface illustrated in FIG. 1(c), referred to as a "front surface" here), and FIG. 2(b) is a view illustrating the constitution of the other surface (referred to as a "back surface") of the FPC 106.

FPC 106 is produced using, for example, a substrate made of polyimide as a main raw material (hereinafter, an FPC substrate). The FPC 106 is constituted in, for example, a rectangular shape in a plan view. As described above in the description of the related art, the shape of the FPC 906 is generally a horizontally long rectangular shape in order to extremely shorten wire patterns and suppress microwave loss at a low level. For this reason, in the present embodiment, similar to the FPC 906, the FPC 106 has a rectangular shape. However, the shape of the FPC 106 is not limited thereto, and can have, for example, a substantially quadrilateral shape.

Four pads 210, 212, 214, and 216 are provided in parallel in the vicinity of the side 200 on the front surface of the FPC 106 illustrated in FIG. 2(a), along a direction of the side 200. In addition, on a side of the other side 202 opposite to the side 200, the four through-holes for signals 220, 222, 224, and 226 are provided in parallel along, for example, a direction of the side 202. Furthermore, the four pads 210, 212, 214, and 216 are respectively electrically connected to the through-holes 220, 222, 224, and 226 through wire patterns 230, 232, 234, and 236.

As described above, the four through-holes 220, 222, 224, and 226 are respectively connected to the four lead pins 120, 122, 124, and 126 provided in the package case 104, and the pads 210, 212, 214, and 216 are respectively electrically connected to pads constituting a part of an electronic circuit provided on an external circuit substrate (by means of, for example, soldering), whereby radio frequency signals output from the electronic circuit are respectively applied to the RF electrode in the optical modulation element 102 through the FPC 106.

A ground pattern 240 (a hatched portion shown in the drawing) is provided on the back surface facing the front surface of the flexible printed circuit 106 provided with the wire patterns 230, 232, 234, and 236 so as to include positions corresponding to the wire patterns 230, 232, 234, and 236 on the front surface, as illustrated in FIG. 2(b). In order to avoid an electrical contact between the ground pattern 240 and the through-holes 220, 222, 224, and 226, a conductor constituting the ground pattern 240 is removed in a circular shape in the peripheral portions of the through-holes 220, 222, 224, and 226.

In this manner, the ground pattern 240 is provided at a position facing the wire patterns 230, 232, 234, and 236 with the substrate of the FPC 106 interposed therebetween, and thus the wire patterns 230, 232, 234, and 236 can be designed so as to be radio frequency signal lines having desired (for example, 50Ω) characteristic impedance.

Meanwhile, a ground pattern (not illustrated) may also be provided on the front surface so that the wire patterns 230, 232, 234, and 236 constitute a well-known line as a signal line for radio frequencies such as a microstrip line, a coplanar line, or a grounded coplanar line.

Similar to the FPC 906 of the related art, the size of the FPC 106 may be, for example, approximately 20 mm or less in the long side direction (the direction of the side 200) and approximately 10 mm or less in the short side direction (a direction perpendicular to the side 200) in order to extremely shorten the wire patterns 230, 232, 234, and 236 and suppress microwave loss at a low level.

Figure 3A:
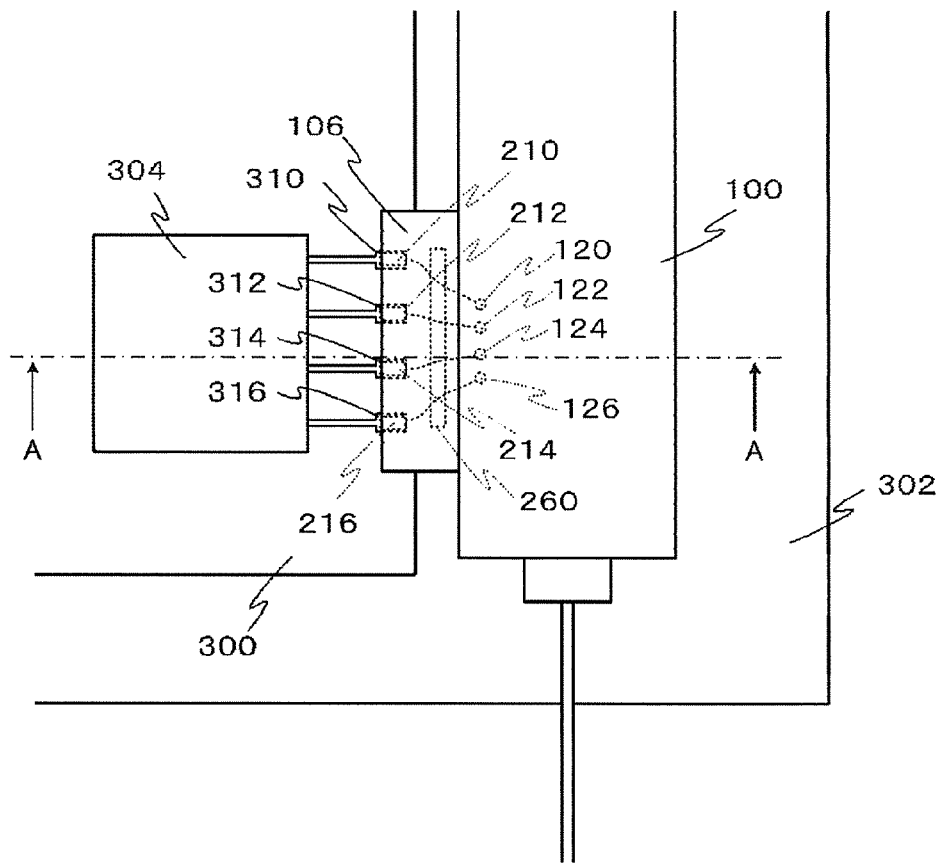
FIGS. 3(a) and 3(b) are views illustrating an example of a state where the optical modulator illustrated in FIGS. 1(a) to 1(c) is connected to a circuit substrate on which an electronic circuit is constituted.
Figure 3B:
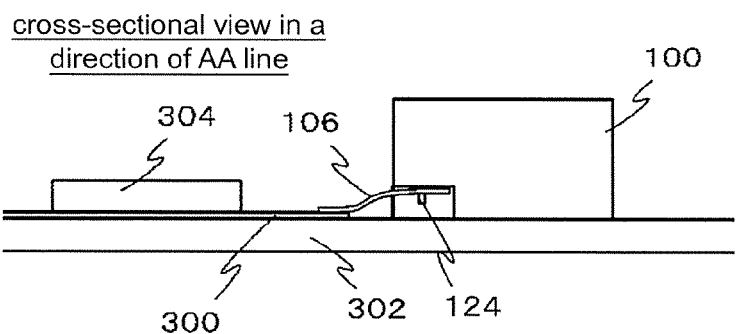

FIGS. 3(a) and 3(b) are views illustrating an example of a state where the optical modulator 100 is connected to a circuit substrate on which an electronic circuit is constituted. FIG. 3(a) is a view of the optical modulator 100 seen from above (a direction in which the surface illustrated in FIG. 1(a) is seen), and FIG. 3(b) is a cross-sectional view in a direction of AA line in FIG. 3(a). Meanwhile, the internal constitution of the optical modulator 100 in FIG. 3(b) is not illustrated.

An electronic circuit including a driving circuit 304 (for example, an integrated circuit (IC) having a driving circuit integrated therein) for driving the optical modulation element 102 of the optical modulator 100 is constituted on the circuit substrate 300, and the optical modulator 100 and the circuit substrate 300 are fixed to, for example, a base 302 inside a package case of an optical transmission device. As illustrated in FIG. 3(a), the FPC 106 of the optical modulator 100 extends from the connection portions with the lead pins 120, 122, 124, and 126 toward the left in the drawing and bends slantwise in the left downward direction in the drawing so as to come into contact with the circuit substrate 300 at the left end portion as illustrated in FIG. 3(b), whereby the pads 210, 212, 214, and 216 of the FPC 106 are fixed by means of, for example, soldering and electrically connected to the pads 310, 312, 314, and 316 on the circuit substrate 300 (FIG. 3(a)).

Meanwhile, the connection between the ground pattern 240 and the optical modulator 100 can be performed, for example, by providing a lead pin for grounding (not illustrated) connected to a ground pattern formed on the optical modulation element 102 in the package case 104, providing a hole (not illustrated) engaging with the lead pin for grounding in the FPC 106, and inserting the lead pin for grounding into the hole so as to be soldered to the ground pattern 240. In addition, the connection between the ground pattern 240 and the circuit substrate 300 can be performed, for example, by providing a conductor pin (not illustrated) brazed to the ground pattern 240 in the FPC 106 and connecting the conductor pin and the ground pattern on the circuit substrate 300 by soldering.

In particular, in the optical modulator 100 of the present embodiment, the wire patterns 230, 232, 234, and 236 which are conductor patterns for propagating a radio frequency signal respectively include radio frequency attenuation portions 250, 252, 254, and 256 (dotted portions, illustrated in the drawing, which respectively constitute portions of the wire patterns 230, 232, 234, and 236) which attenuate power of the radio frequency signal by a predetermined amount, as illustrated in FIG. 2(a). More specifically, the radio frequency attenuation portions 250, 252, 254, and 256 in the present embodiment are respectively constituted of portions of the wire patterns 230, 232, 234, and 236 (that is, portions of the wire patterns 230, 232, 234, and 236 covered with a radio frequency attenuation film 260) which are loaded with the radio frequency attenuation film 260 formed of a material including carbon and/or ferrite.

The portions of the wire patterns 230, 232, 234, and 236 loaded with the radio frequency attenuation film 260 function as the radio frequency attenuation portions 250, 252, 254, and 256 that attenuate power of a radio frequency signal propagating through the wire patterns 230, 232, 234, and 236 by a predetermined amount (set to be A (%)) because a portion of the radio frequency signal flows into the radio frequency attenuation film 260 and changes into heat to be consumed. The amount of attenuation A of the power of the radio frequency signal can be adjusted depending on the size (thickness, or a distance along the length direction (the propagation direction of the radio frequency signal) of the wire patterns 230, 232, 234, and 236) of the radio frequency attenuation film 260.

Thereby, for example, the radio frequency signal output from the driving circuit 304 is attenuated in the radio frequency attenuation portions 250, 252, 254, and 256 by a predetermined amount A (%) and reaches the optical modulator 100, but the radio frequency signal having passed through the radio frequency attenuation portions 250, 252, 254, and 256 and reflected from any one position (for example, the soldering connection portions between the through-holes 220, 222, 224, and 226 and the lead pins 120, 122, 124, and 126) before reaching an electrode (not illustrated) on the optical modulation element 102 passes through the radio frequency attenuation portions 250, 252, 254, and 256 again, is further attenuated by a predetermined amount A (%), and reaches the driving circuit 304, and thus an unstable phenomenon of the operation of the driving circuit 304 which is caused by the reflection of the radio frequency signal is prevented (or suppressed).

As a result, it is possible to maintain high light transmission quality by appropriately driving the optical modulator 100 by the driving circuit 304.

Meanwhile, in the present embodiment, each of the wire patterns 230, 232, 234, and 236 is provided with one radio frequency attenuation portion, but the number of radio frequency attenuation portions provided in each of the wire patterns is not limited to one and may be two or more.

In the present embodiment, the radio frequency attenuation portions 250, 252, 254, and 256 are respectively constituted of the portions of the wire patterns 230, 232, 234, and 236 loaded with the radio frequency attenuation film 260. However, the present invention is not limited thereto, and the radio frequency attenuation portions can have any constitution as long as radio frequencies are attenuated. In addition, it is desirable that the radio frequency attenuation portions 250, 252, 254, and 256 attenuate the power of the radio frequency signal by absorbing and or diffusing the power of the radio frequency signal without reflecting the power.

Next, a modification example of the present embodiment will be described with reference to FIGS. 4(a) and 4(b) to FIGS. 7(a) and 7(b). An FPC described below can be used in the optical modulator 100, instead of the FPC 106.

First Modification Example

First, a first modification example of the FPC 106 which is used in the optical modulator 100 illustrated in FIGS. 1(a) to 1(c) will be described.

In the FPC 106 illustrated in FIGS. 2(a) and 2(b), the radio frequency attenuation portions 250, 252, 254, and 256 are constituted as portions of the wire patterns 230, 232, 234, and 236 loaded with the radio frequency attenuation film 260. On the other hand, in the present modification example, the radio frequency attenuation portions are constituted of curved portions of conductor patterns which are constituted such that a propagation direction of a radio frequency signal is bent up to an angle equal to or greater than 90 degrees and/or is curved with a predetermined curvature.

Figure 4A:
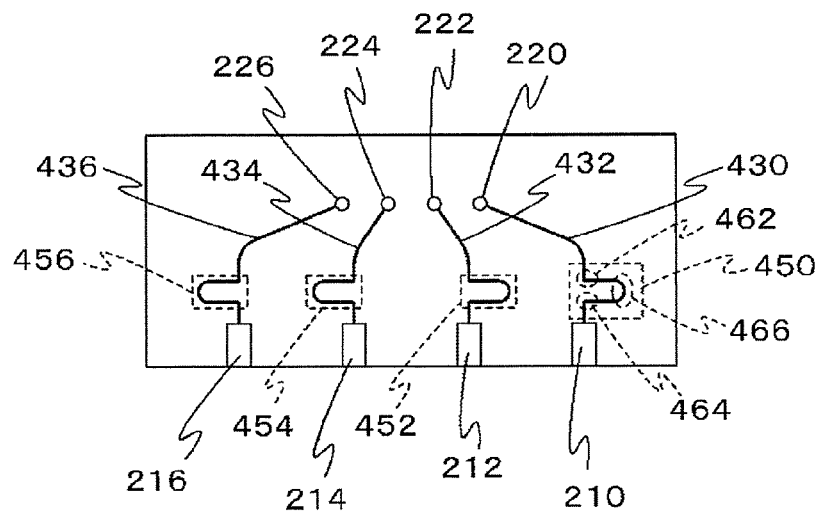
FIGS. 4(a) and 4(b) are views illustrating a first modification example of an FPC which is used in the optical modulator illustrated in FIGS. 1(a) to 1(c).
Figure 4B:
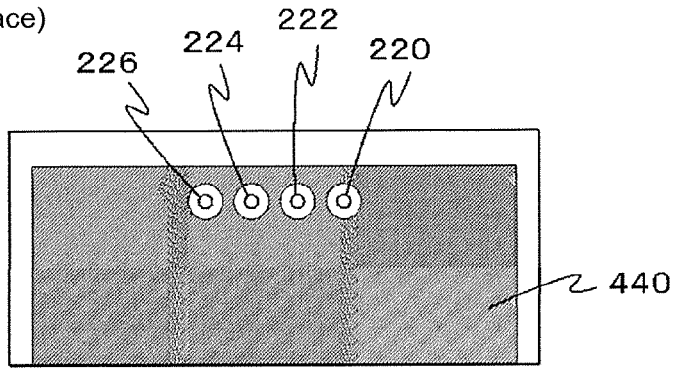

FIGS. 4(a) and 4(b) are views illustrating the constitution of an FPC 400 the present modification example which is usable instead of the FPC 106. FIG. 4(a) is a view illustrating the constitution of one surface (a surface (referred to as a "front surface") which is equivalent to the surface of the FPC 106 illustrated in FIG. 1(c)) of the FPC 400, and FIG. 4(b) is a view illustrating the constitution of the other surface (referred to as a "back surface") of the FPC 400. Meanwhile, in FIGS. 4(a) and 4(b), the same constituent elements as those of the FPC 106 illustrated in FIGS. 2(a) and 2(b) will be denoted by the same reference numerals and signs, and the above description regarding FIGS. 2(a) and 2(b) will be incorporated.

The FPC 400 illustrated in FIGS. 4(a) and 4(b) has the same constitution as that of the FPC 106 illustrated in FIGS. 2(a) and 2(b), but is different from the FPC 106 in that the FPC 400 does not include the radio frequency attenuation film 260 and includes wire patterns 430, 432, 434, and 436 instead of the wire patterns 230, 232, 234, and 236.

Portions of the wire patterns 430, 432, 434, and 436 respectively constitute radio frequency attenuation portions 450, 452, 454, and 456, and each of the radio frequency attenuation portions 450, 452, 454, and 456 is constituted of two bent portions of a conductor pattern changing a propagation direction of a radio frequency signal by 90 degrees, and a curved portion of a curved conductor pattern changing the propagation direction of the radio frequency signal by 180 degrees with a predetermined curvature. For example, the radio frequency attenuation portion 450 includes two bent portions 462 and 464 changing the propagation direction of the radio frequency signal by 90 degrees and a curved portion 466 changing the propagation direction of the radio frequency signal by 180 degrees with a predetermined curvature. In addition, a ground pattern 440 (a hatched portion shown in the drawing) having the same constitution as that of the ground pattern 240 of the FPC 106 is formed on the back surface of the FPC 400.

Regarding a radio frequency signal propagating through the wire pattern 430 which is a conductor pattern, a portion of power of the radio frequency signal leaks out and is diffused from the conductor pattern in the bent portions 462 and 464 and the curved portion 466 having a predetermined small curvature (that is, a portion of the power of the radio frequency signal propagating through the wire pattern 430 in a waveguide mode is radiated in the air by conversion into a radiation mode in the bent portions 462 and 464 and/or the curved portion 466) because of straight travelling performance of the radio frequency signal. As a result, the radio frequency attenuation portion 450 functions as an attenuator that attenuates the power of the radio frequency signal by the amount of power diffused from the bent portions 462 and 464 and the curved portion 466 which constitute the radio frequency attenuation portion. In addition, the amount of attenuation can be adjusted or designed to a desired value depending on the size of an angle of a change in the propagation direction of the radio frequency signal in the bent portions 462 and 464, the curvature of the curved portion 466, and/or the size of an angle of a change in the propagation direction of the radio frequency signal.

The other radio frequency attenuation portions 452, 454, and 456 have the same constitution as the above-described constitution of the radio frequency attenuation portion 450 as illustrated in FIGS. 4(a) and 4(b), and thus the above description regarding the radio frequency attenuation portion 450 will be incorporated with respect to details and operations of the constitutions of the other radio frequency attenuation portions.

Meanwhile, in the present embodiment, each of the radio frequency attenuation portions 450, 452, 454, and 456 is constituted of two bent portions and one curved portion. However, the present invention is not limited thereto, and the radio frequency attenuation portion can be constituted of at least one bent portion (that is, the bent portion of the conductor pattern) which bends the propagation direction of the radio frequency signal up to an angle equal to or greater than 90 degrees in accordance with a required amount of attenuation, and/or at least one curved portion (that is, the curved portion of the conductor pattern) which changes the propagation direction of the radio frequency signal up to an angle equal to or greater than 90 degrees with a predetermined curvature.

Second Modification Example

Next, a second modification example of the FPC 106 which is used in the optical modulator 100 illustrated in FIGS. 1(a) to 1(c) will be described.

In the present modification example, a radio frequency attenuation portion is constituted of a portion of a wire pattern which is provided on the front surface of the FPC having a ground pattern provided on the back surface thereof, the portion being a portion in which a distance to a portion of the back surface which is not provided with a ground pattern is a predetermined distance shorter than that in the other portions of the wire pattern. The radio frequency attenuation portion can be constituted, for example, by removing a portion of the ground pattern provided on the back surface of the FPC from the vicinity (for example, a predetermined distance range from the position of the portion of the wire pattern) of the portion of the wire pattern which is provided on the front surface of the FPC. Meanwhile, in order to facilitate understanding by avoiding a redundant description, a "vicinity" of something means, for example, a portion in a "predetermined distance range" from the something, as described above.

Figure 5A:
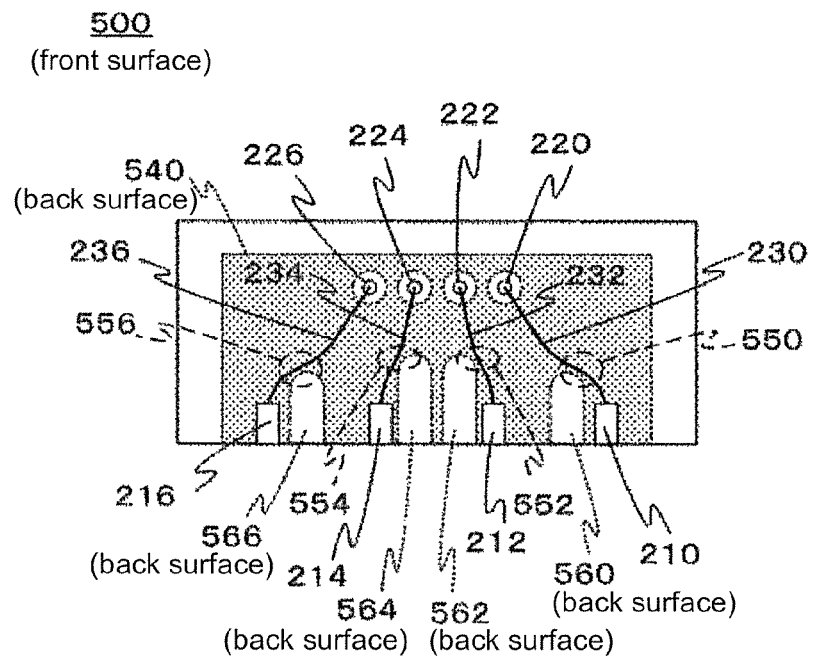
FIGS. 5(a) and 5(b) are views illustrating a second modification example of the FPC which is used in the optical modulator illustrated in FIGS. 1(a) to 1(c).
Figure 5B:
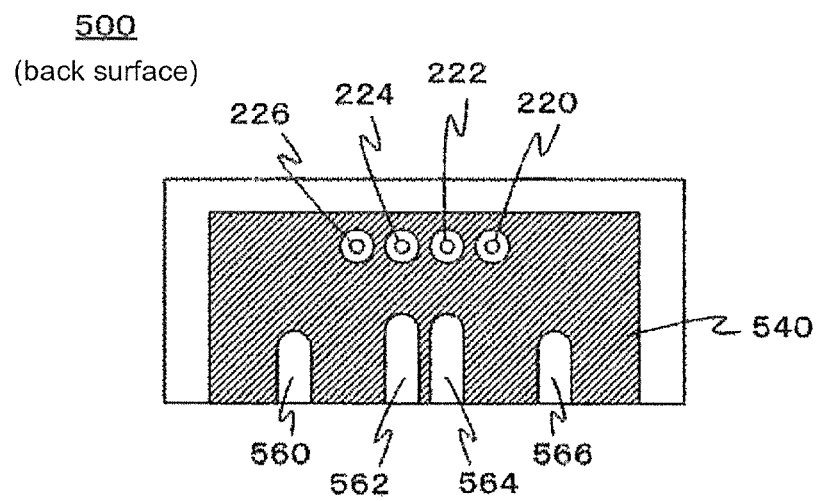

FIGS. 5(a) and 5(b) are views illustrating the constitution of an FPC 500 according to the present modification example which is usable instead of the FPC 106. FIG. 5(a) is a view illustrating the constitution of one surface of the FPC 500 (a surface (referred to as a "front surface") which is equivalent to the surface of the FPC 106 illustrated in FIG. 1(c)), and FIG. 5(b) is a view illustrating the constitution of the other surface (referred to as a "back surface") of the FPC 500. Meanwhile, in FIGS. 5(a) and 5(b), is a view illustrating the constitution of the other surface (referred to as a "back surface") of the FPC 106 illustrated in FIGS. 2(a) and 2(b) will be denoted by the same reference numerals and signs, and the above description regarding FIGS. 2(a) and 2(b) will be incorporated.

The FPC 500 illustrated in FIGS. 5(a) and 5(b) has the same constitution as that of the FPC 106 illustrated in FIGS. 2(a) and 2(b), but is different from the FPC 106 in that the FPC 500 does not include the radio frequency attenuation film 260 (FIG. 5(a)) and includes a ground pattern 540 (a hatched portion shown in the drawing) instead of the ground pattern 240 (FIG. 5(b)). Meanwhile, in FIG. 5(a) illustrating the front surface of the FPC 500, the ground pattern 540 provided on the back surface is shown as a hatched portion surrounded by a dotted line in order to clarify positional relationships between the ground pattern 540 provided on the back surface (FIG. 5(b)) of the FPC 500 and the wire patterns 230, 232, 234, and 236 provided on the front surface (FIG. 5(a)). Meanwhile, the portion is a shape when the back surface is seen through from the front surface, and thus the right and left sides illustrated in the drawing are reversed with respect to the shape of the ground pattern 540 on the back surface illustrated in FIG. 5(b).

The ground pattern 540 provided on the back surface of the FPC 500 has conductor-removed portions 560, 562, 564, and 566 from which a conductor constituting the ground pattern 540 is removed. The conductor-removed portions 560, 562, 564, and 566 respectively extend to the vicinities of the curved portions of the wire patterns 230, 232, 234, and 236 on the front surface.

Thereby, in the curved portions of the wire patterns 230, 232, 234, and 236, the conductor of the ground pattern 540 on the back surface is removed in the vicinities of the curved portions, and thus the strength of confinement of a radio frequency signal, propagating through the curved portions, in the curved portions is reduced. As a result, a portion of the radio frequency signal propagating through the curved portions in a waveguide mode is converted into a radiation mode and is radiated in the air. That is, the curved portions of the wire patterns 230, 232, 234, and 236 in which the conductor of the ground pattern 540 is removed by the conductor-removed portions 560, 562, 564, and 566 in the vicinities thereof respectively constitute radio frequency attenuation portions 550, 552, 554, and 556 attenuating a portion of the power of the radio frequency signal by radiation.

Meanwhile, in the present embodiment, the conductor of the ground pattern 540 in the vicinities of the curved portions of the wire patterns 230, 232, 234, and 236 is removed as illustrated in FIGS. 5(a) and 5(b). However, the present invention is not limited thereto, and the conductor of the ground pattern 540 in the vicinities of linear portions of the wire patterns 230, 232, 234, and 236 may be removed. Also in this case, it is possible to attenuate the power of the radio frequency signal propagating through the linear portions by reducing the strength of confinement of the radio frequency signal propagating through the linear portions and diffusing a portion of the power of the radio frequency signal, which propagates in a waveguide mode, in the air in a radiation mode.

In addition, as illustrated in FIGS. 5(a) and 5(b), the radio frequency attenuation portions may be constituted of extending the conductor-removed portions of the ground pattern 540 to positions just below the curved portions of the wire patterns 230, 232, 234, and 236 with the substrate of the FPC 500 interposed therebetween, in addition to constituting the radio frequency attenuation portions 550, 552, 554, and 556 by extending the conductor-removed portions 560, 562, 564, and 566 of the ground pattern 540 to the vicinities of the curved portions of the wire patterns 230, 232, 234, and 236. Also in this case, it is possible to attenuate the radio frequency signal propagating through the wire patterns by weakening the confinement of the radio frequency signal in the radio frequency attenuation portions and diffusing a portion of power of the radio frequency signal in the air as a radiation mode.

Further, in the present embodiment, the ground pattern is provided on only the back surface which is not provided with the wire pattern 230 and the like. However, the present invention is not limited thereto, and the ground pattern can also be provided on the front surface which is provided with the wire pattern 230 and the like. In this case, the radio frequency attenuation portions can be constituted of removing a portion of the conductor of the ground pattern provided on the front surface in the vicinities of portions of the wire pattern 230 and the like, instead of or in addition to providing the conductor-removed portions 560, 562, 564, and 566 in the ground pattern 540 on the back surface. In this manner, also in a case where a portion of the conductor of the ground pattern provided on the front surface is removed in the vicinities of portions of the wire pattern 230 and the like, it is possible to attenuate the power of the radio frequency signal propagating through the wire pattern 230 and the like by weakening the confinement of the radio frequency signal in portions of the wire pattern 230 and the like and diffusing a portion of the power of the radio frequency signal in the air as a radiation mode, similar to the present modification example illustrated in FIGS. 5(*a*) and 5(*b*).

Third Modification Example

Next, a third modification example of the FPC 106 which is used in the optical modulator 100 illustrated in FIGS. 1(*a*) to 1(*c*) will be described.

In the present modification example, a radio frequency attenuation portion is constituted of removing a portion of a conductor of a ground pattern on a back surface in the FPC 400 according to the first modification example, similar to the FPC 500 according to the second modification example. That is, the radio frequency attenuation portion is constituted of removing a portion of the conductor of the ground pattern in the vicinities of a bent portion and/or a curved portion of a conductor pattern constituted such that a propagation direction of a radio frequency signal is bent up to an angle equal to or greater than 90 degrees and/or is curved with a predetermined curvature.

Figure 6A:
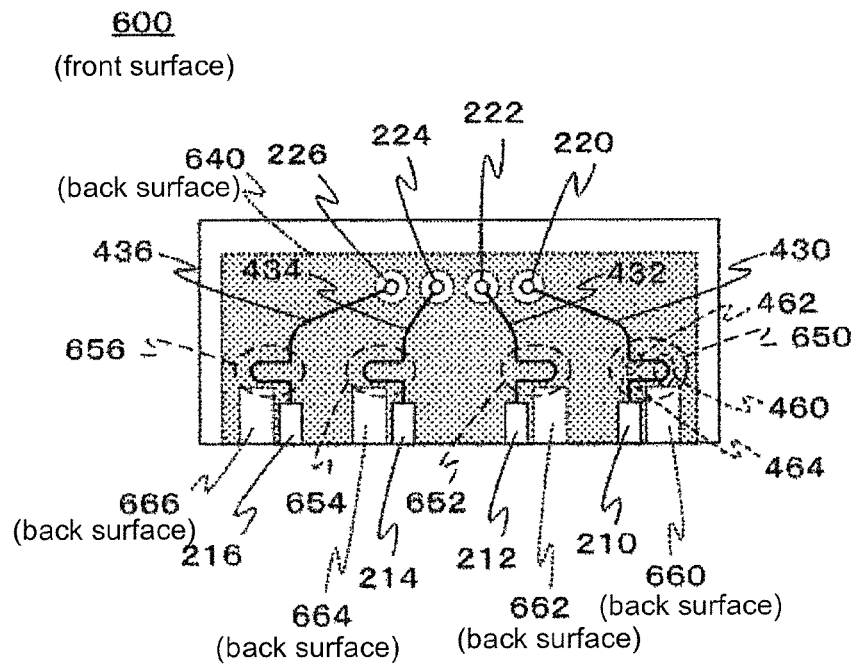
FIGS. 6(a) and 6(b) are views illustrating a third modification example of the FPC which is used in the optical modulator illustrated in FIGS. 1(a) to 1(c).
Figure 6B:
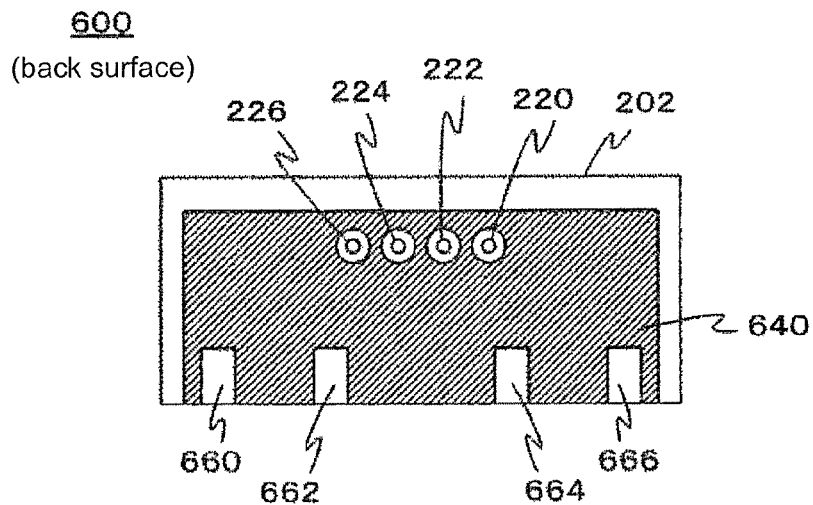
Figure 7A:
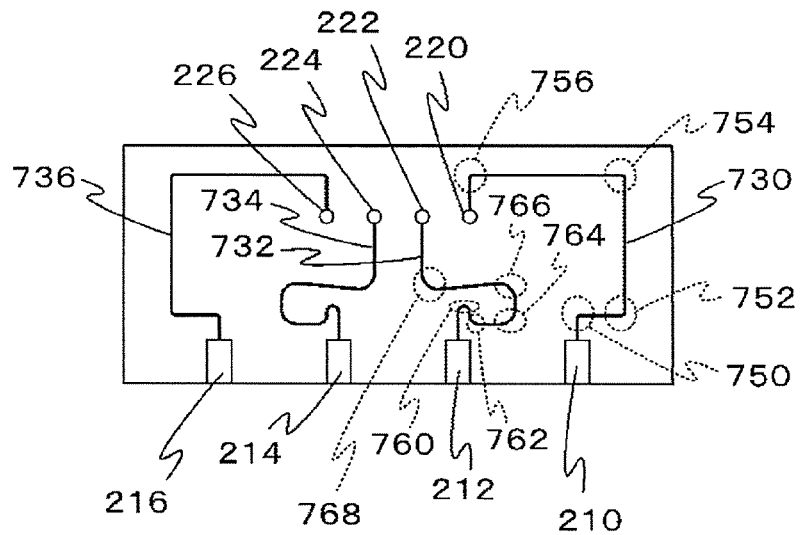
FIGS. 7(a) and 7(b) are views illustrating a fourth modification example of the FPC which is used in the optical modulator illustrated in FIGS. 1(a) to 1(c).
Figure 7B:
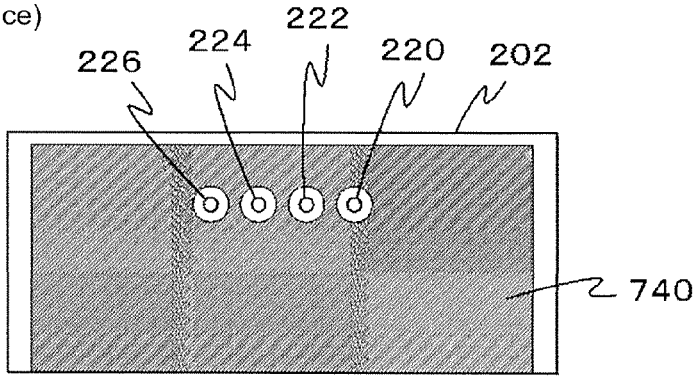

FIGS. 6(*a*) and 6(*b*) are views illustrating the constitution of an FPC 600 according to the present modification example which is usable instead of the FPC 106. FIG. 6(*a*) is a view illustrating the constitution of one surface (a surface (referred to as a "font surface") which is equivalent to the surface of the FPC 106 illustrated in FIG. 1(*c*)) of the FPC 600, and FIG. 6(*b*) is a view illustrating the constitution of the other surface (referred to as a "back surface") of the FPC 600. Meanwhile, in FIGS. 6(*a*) and 6(*b*), the same constituent elements as those of the FPC 106 or the FPC 400 illustrated in FIGS. 2(*a*) and 2(*b*) or FIGS. 4(*a*) and 4(*b*) will be denoted by the same reference numerals and signs, and the above description regarding FIGS. 2(*a*) and 2(*b*) or FIGS. 4(*a*) and 4(*b*) will be incorporated.

The FPC 600 illustrated in FIGS. 6(*a*) and 6(*b*) has the same constitution as that of the FPC 400 illustrated in FIGS. 4(*a*) and 4(*b*), but is different from the FPC 400 in that the FPC 600 includes a ground pattern 640 (a hatched portion shown in the drawing) instead of the ground pattern 440 (FIG. 6(*b*)). In addition, the FPC 600 is different from the FPC 400 in that radio frequency attenuation portions 650, 652, 654, and 656 are provided instead of the radio frequency attenuation portions 450, 452, 454, and 456. Meanwhile, in FIG. 6(*a*) illustrating the front surface of the FPC 600, the ground pattern 640 provided on the back surface is shown as a hatched portion surrounded by a dotted line in order to clarify positional relationships between the ground pattern 640 provided on the back surface (FIG. 6(*b*)) of the FPC 600 and the wire patterns 430, 432, 434, and 436 provided on the front surface (FIG. 6(*a*)). Meanwhile, the portion is a shape when the back surface is seen through from the front surface, and thus the right and left sides illustrated in the drawing are reversed with respect to the shape of the ground pattern 640 on the back surface illustrated in FIG. 6(*b*).

The ground pattern 640 provided on the back surface of the FPC 600 has conductor-removed portions 660, 662, 664, and 666 from which a conductor constituting the ground pattern 640 is removed. The conductor-removed portions 660, 662, 664, and 666 respectively extend to the vicinities of curved portions of the wire patterns 430, 432, 434, and 436 which are curved at 180 degrees on the front surface (for example, the conductor-removed portion 660 extends to the vicinity of the curved portion 466 of the wire pattern 430).

The radio frequency attenuation portions 650, 652, 654, and 656 is constituted to include two bent portions (for example, the bent portions 462 and 464 of the wire pattern 430) of the conductor pattern changing a propagation direction of a radio frequency signal by 90 degrees and a curved portion (for example, the curved portion 466 of the wire pattern 430) of the conductor pattern, changing the propagation direction of the radio frequency signal by 180 degrees with a predetermined curvature, which is curved by 180 degrees, similar to the radio frequency attenuation portions 450, 452, 454, and 456 in the first modification example, and is constituted to further include the conductor-removed portions 660, 662, 664, and 666 in the vicinity of the curved portion.

Thereby, in the portions of the wire patterns 430, 432, 434, and 436 which are curved at 180 degrees, the conductor of the ground pattern 640 on the back surface is removed in the vicinities of the curved portions. Thus, the strength of confinement of a radio frequency signal, propagating through the curved portions, in the curved portions is reduced, and a portion of power of the radio frequency signal is diffused in the air. Therefore, the amount of attenuation of the power of the radio frequency signal in the radio frequency attenuation portions 650, 652, 654, and 656 is larger than in the radio frequency attenuation portions 450, 452, 454, and 456 according to the first modification example.

Meanwhile, in the present embodiment, the conductor of the ground pattern 640 in the vicinities of the curved portions (for example, the curved portion 466 of the wire pattern 430) of the wire patterns 430, 432, 434, and 436 which are curved at 180 degrees is removed as illustrated in FIGS. 6(*a*) and 6(*b*). However, the present invention is not limited thereto, and the above-described effects can be obtained even when the conductor of the ground pattern 640 in the vicinity of at least one bent portion (for example, the bent portion 462 or 464 of the wire pattern 430) of the wire patterns 430, 432, 434, and 436 is removed.

Fourth Modification Example

Next, a fourth modification example of the FPC 106 which is used in the optical modulator 100 illustrated in FIGS. 1(*a*) to 1(*c*) will be described.

In the present modification example, each of wire patterns is provided with a plurality of bent portions changing a propagation direction of a radio frequency signal by 90 degrees and/or a plurality of curved portions changing the propagation direction of the radio frequency signal by 180 degrees with a predetermined curvature, and each of the bent portions and/or the curved portions constitutes a radio frequency attenuation portion.

FIGS. 7(*a*) and 7(*b*) are views illustrating the constitution of an FPC 700 according to the present modification example which is usable instead of the FPC 106. FIG. 7(*a*)

is a view illustrating the constitution of one surface (a surface (referred to as a "front surface") which is equivalent to the surface of the FPC 106 illustrated in FIG. 1(*c*)) of the FPC 700, and FIG. 7(*b*) is a view illustrating the constitution of the other surface (referred to as a "back surface") of the FPC 700. Meanwhile, in FIGS. 7(*a*) and 7(*b*), the same constituent elements as those of the FPC 106 illustrated in FIGS. 2(*a*) and 2(*b*) will be denoted by the same reference numerals and signs, and the above description regarding FIGS. 2(*a*) and 2(*b*) will be incorporated.

The FPC 700 illustrated in FIGS. 7(*a*) and 7(*b*) has the same constitution as that of the FPC 106 illustrated in FIGS. 2(*a*) and 2(*b*), but is different from the FPC 106 in that the FPC 700 does not include the radio frequency attenuation film 260 and includes wire patterns 730, 732, 734, and 736 instead of the wire patterns 230, 232, 234, and 236.

The wire pattern 730 includes four radio frequency attenuation portions 750, 752, 754, and 756 constituted of a bent portion changing a propagation direction of a radio frequency signal nu 90 degrees. In addition, the wire pattern 732 includes a radio frequency attenuation portion 760 constituted of a curved portion changing the propagation direction of the radio frequency signal by 180 degrees with a predetermined curvature and radio frequency attenuation portions 762, 764, 766, and 768 constituted of a curved portion changing the propagation direction of the radio frequency signal by an angle equal to or greater than 90 degrees with a predetermined curvature.

Thereby, the wire patterns 730 and 732 more effectively reduces the power of the radio frequency signal reflected from the soldering connection portions between the through-holes 220, 222, 224, and 226 and the lead pins 120, 122, 124, and 126 by the plurality of radio frequency attenuation portions 750, 752, 754, and 756 and the radio frequency attenuation portions 760, 762, 764, 766, and 768, and thus it is possible to prevent the occurrence of an unstable phenomenon caused by backflow of the radio frequency signal to an electronic circuit (for example, driving circuit 304) driving the optical modulator 100 and to realize stable driving of the optical modulator 100.

Meanwhile, as illustrated in FIGS. 7(*a*) and 7(*b*), the wire pattern 734, which is in line symmetry with the wire pattern 732, has the same constitution as the wire pattern 732 and has the same operations as the wire pattern 732. In addition, the wire pattern 736, which is in line symmetry with the wire pattern 730, has the same constitution as the wire pattern 730 and has the same operations as the wire pattern 730. Accordingly, regarding the constitutions and operations of the wire patterns 734 and 736, the above description regarding the constitutions and operations of the wire patterns 732 and 730 will be incorporated.

Second Embodiment

Next, a second embodiment of the present invention will be described. The present embodiment relates to an optical transmission device on which the optical modulator 100 (including the optical modulator using the FPC according to any one of the modification examples illustrated in FIGS. 4(*a*) and 4(*b*) to FIGS. 7(*a*) and 7(*b*)) described in the first embodiment is mounted.

Figure 8:
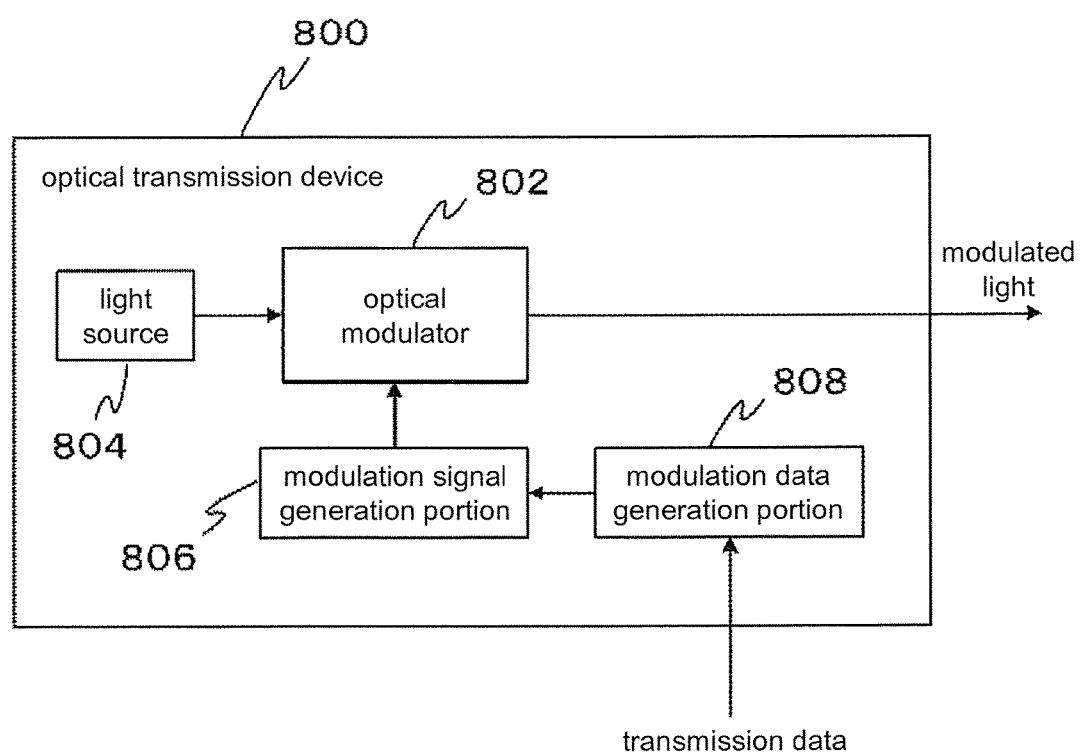
FIG. 8 is a view illustrating the constitution of an optical communication device according to a second embodiment of the present invention.
Figure 9A:
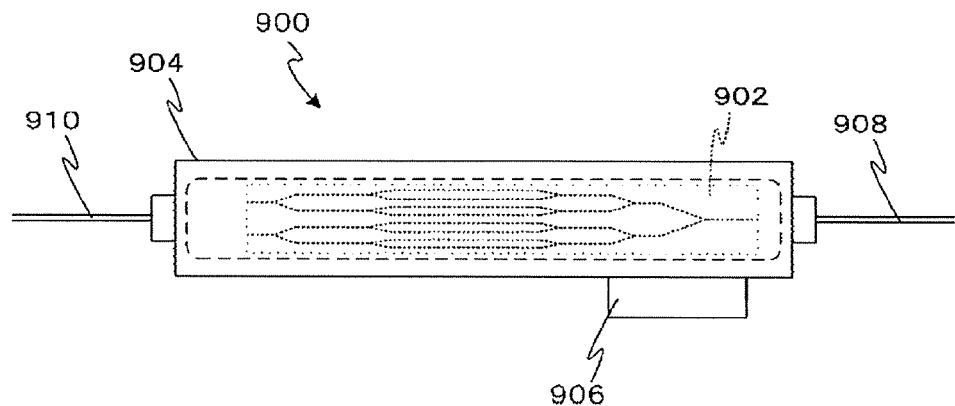
FIGS. 9(a) to 9(c) are views illustrating the constitution of an optical modulator of the related art.
Figure 9B:
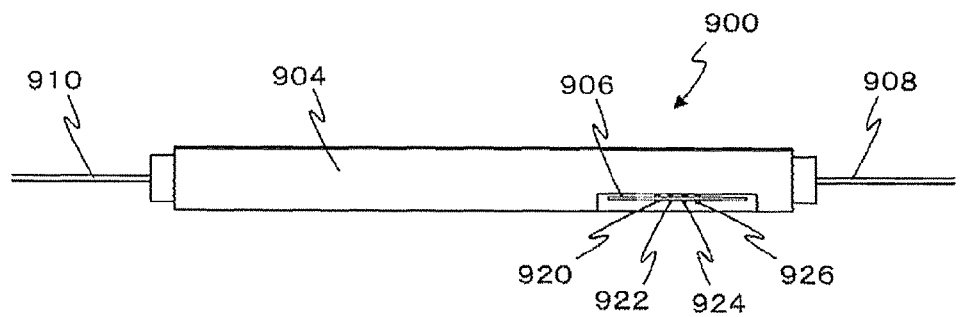
Figure 9C:
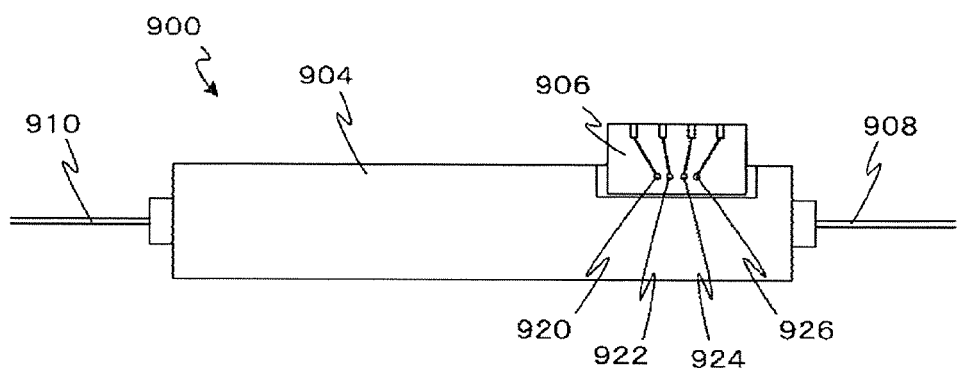
Figure 10A:
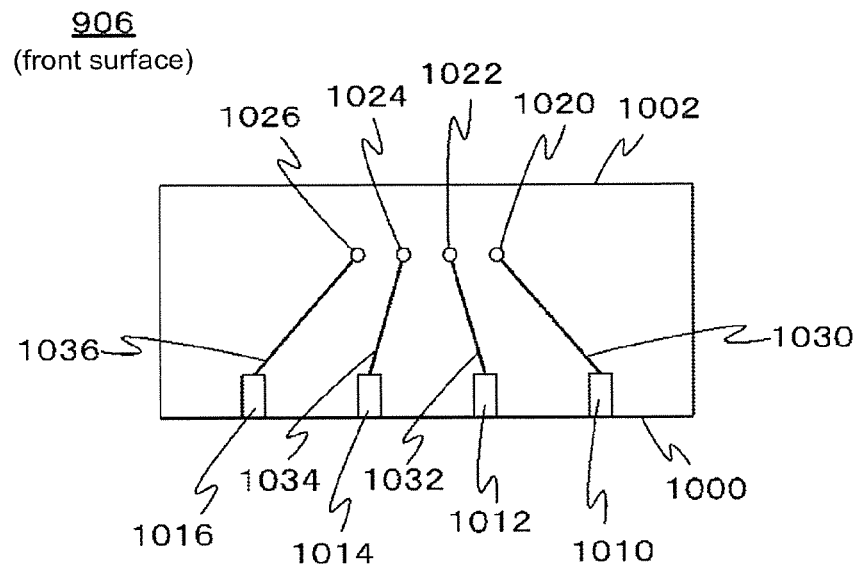
FIGS. 10(a) and 10(b) are views illustrating the constitution of an FPC which is used in the optical modulator illustrated in FIGS. 9(a) to 9(c).
Figure 10B:
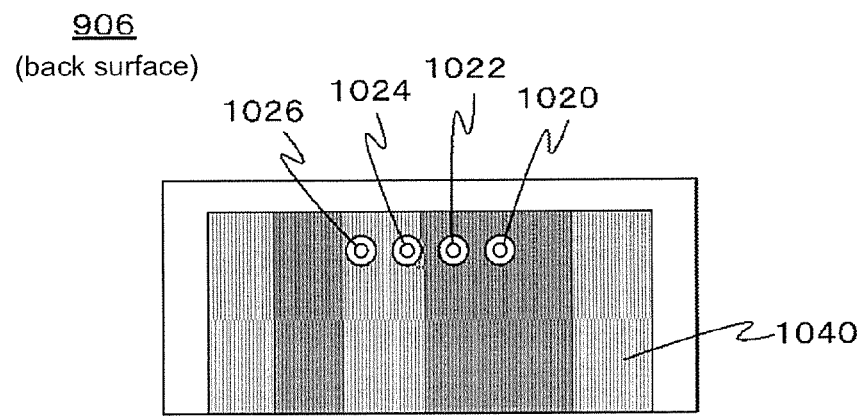
Figure 11A:
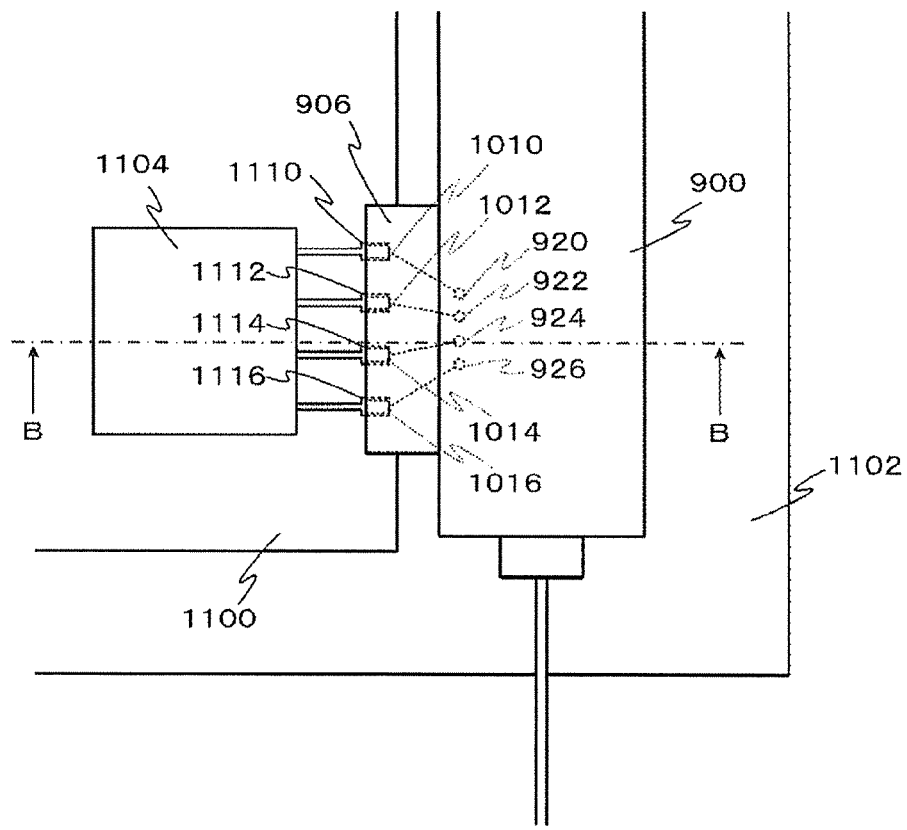
FIGS. 11(a) and 11(b) are views illustrating an example of a state where the optical modulator illustrated in FIGS. 9(a) to 9(c) is connected to a circuit substrate on which an electronic circuit is constituted.
Figure 11B:
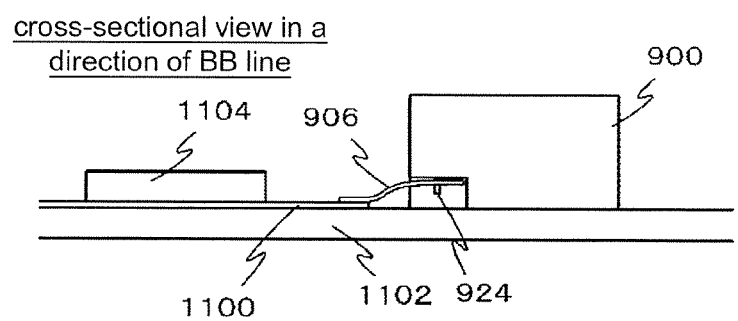

FIG. 8 is a view illustrating the constitution of an optical transmission device according to the present embodiment. An optical transmission device 800 includes an optical modulator 802, a light source 804 making light incident on the optical modulator 802, a modulation signal generation portion 806, and a modulation data generation portion 808.

The optical modulator 802 is the optical modulator 100 illustrated in FIGS. 1(*a*) to 1(*c*) (may include any one of the FPCs 400, 500, 600, and 700 illustrated in FIGS. 4(*a*) and 4(*b*) to FIGS. 7(*a*) and 7(*b*) instead of the FPC 106). The modulation data generation portion 808 generates modulation data for receiving transmission data supplied from the outside and transmitting the transmission data (for example, data obtained by converting or processing transmission data to a predetermined data format) and outputs the generated modulation data to the modulation signal generation portion 806.

The modulation signal generation portion 806 is an electronic circuit including a driving circuit (for example, the driving circuit 304) that outputs electric signals for causing modulation operation in the optical modulator 802, generates modulation signals which are radio frequency signals for causing optical modulation operations according to the modulation data in the optical modulator 802 on the basis of the modulation data output by the modulation data generation portion 808, and inputs the modulation signals to the optical modulator 100. The modulation signals are made up of four RF signals corresponding to four RF electrodes (not illustrated) in the optical modulation element 102 in the optical modulator 100.

The four RF signals are respectively input to the pads 210, 212, 214, and 216 on FPC 106 (which may be, as described above, any FPC of the modification examples described above regarding FPC 106) in the optical modulator 100 and are respectively applied to the RF electrodes through the wire patterns 230, 232, 234, and 236, the through-holes 220, 222, 224, and 226, and the lead pins 120, 122, 124, and 126.

Therefore, light output from the light source 804 is modulated by the optical modulator 100, turns into modulated light, and is output from the optical transmission device 800.

In particular, in the optical transmission device 800, the optical modulator 100 having the above-described constitution is used as the optical modulator 802. Thus, even when the reflection of a radio frequency signal occurs in connection portions between the through-hole 220 and the like of the FPC 106 and the like included in the optical modulator 100 and the lead pin 120 and the like of the package case 104, it is possible to prevent the occurrence of unstable operation of the modulation signal generation portion 806 by effectively reducing the power of the radio frequency signal flowing back to the modulation signal generation portion 806, and to maintain high light transmission quality by appropriately driving the optical modulator 100.

The invention claimed is:

1. An optical modulator comprising:
 a flexible printed circuit for performing electrical connection with a circuit substrate,
 wherein the flexible printed circuit includes at least one wire pattern for propagating a radio frequency signal, and
 wherein the wire pattern includes at least one radio frequency attenuation portion for attenuating power of the radio frequency signal by a predetermined amount.

2. The optical modulator according to claim 1,
 wherein the radio frequency attenuation portion is formed of a portion of the wire pattern loaded with a radio frequency attenuation film.

3. The optical modulator according to claim 2,
 wherein the radio frequency attenuation film is formed of a material including carbon and/or ferrite.

4. The optical modulator according to claim 1,
wherein the radio frequency attenuation portion is a curved conductor pattern which is formed such that a propagation direction of the radio frequency signal is curved up to an angle equal to or greater than 90 degrees with a predetermined curvature.

5. The optical modulator according to claim 1,
wherein the radio frequency attenuation portion is a conductor pattern which is formed such that a propagation direction of the radio frequency signal is bent up to an angle equal to or greater than 90 degrees.

6. The optical modulator according to claim 1,
wherein the flexible printed circuit is constituted such that the wire pattern is provided on one surface and a ground pattern is provided on the other surface of the flexible printed circuit, and
wherein the radio frequency attenuation portion is formed by removing a portion of a conductor of the ground pattern on the other surface in a predetermined distance range from a portion of the wire pattern provided on the one surface.

7. The optical modulator according to claim 6,
wherein the portion of the wire pattern provided on the one surface is a curved portion of a conductor pattern forming the wire pattern.

8. The optical modulator according to claim 6,
wherein the portion of the wire pattern provided on the one surface is a curved portion of a curved conductor pattern which is formed such that a propagation direction of the radio frequency signal is curved up to an angle equal to or greater than 90 degrees with a predetermined curvature.

9. The optical modulator according to claim 6,
wherein the portion of the wire pattern provided on the one surface is a curved portion of a conductor pattern which is formed such that a propagation direction of the radio frequency signal is bent up to an angle equal to or greater than 90 degrees.

10. An optical transmission device comprising:
the optical modulator according to claim 1; and
an electronic circuit outputting at least a radio frequency signal for causing the optical modulator to perform a modulation operation.

* * * * *